E. SCHNEIDER.
DISSOLVING VIEW APPARATUS.
APPLICATION FILED JAN. 20, 1912.
1,280,869.
Patented Oct. 8, 1918.
3 SHEETS—SHEET 3.
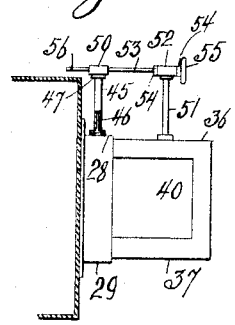
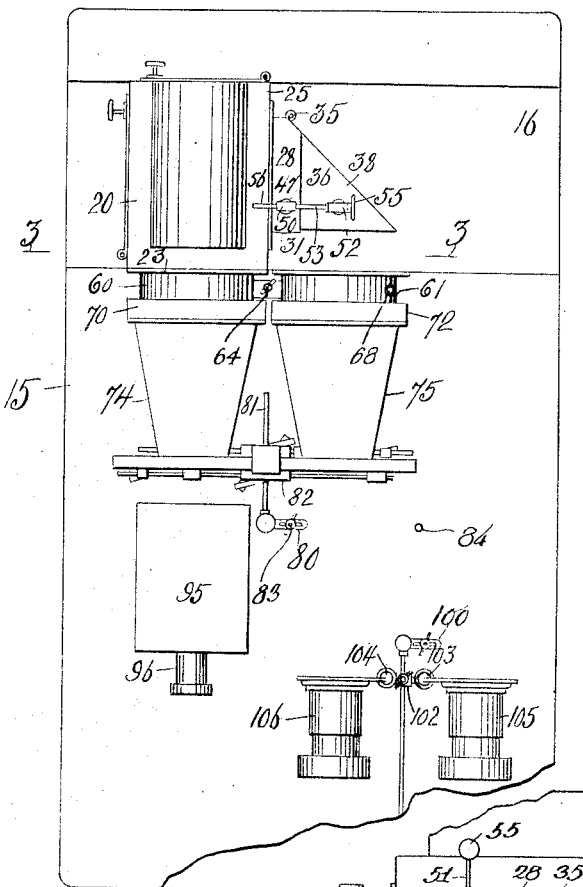
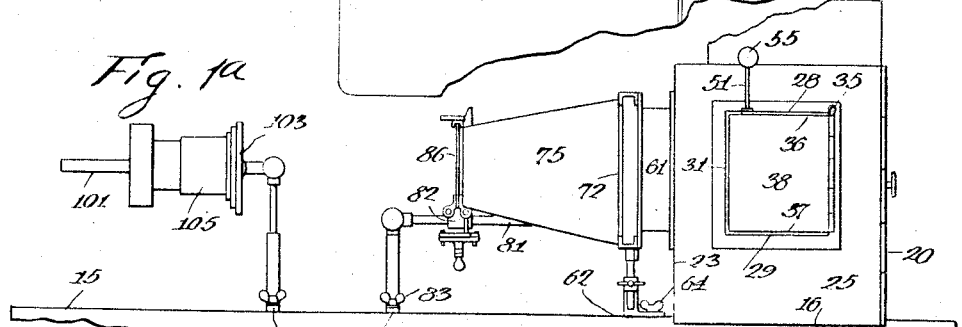

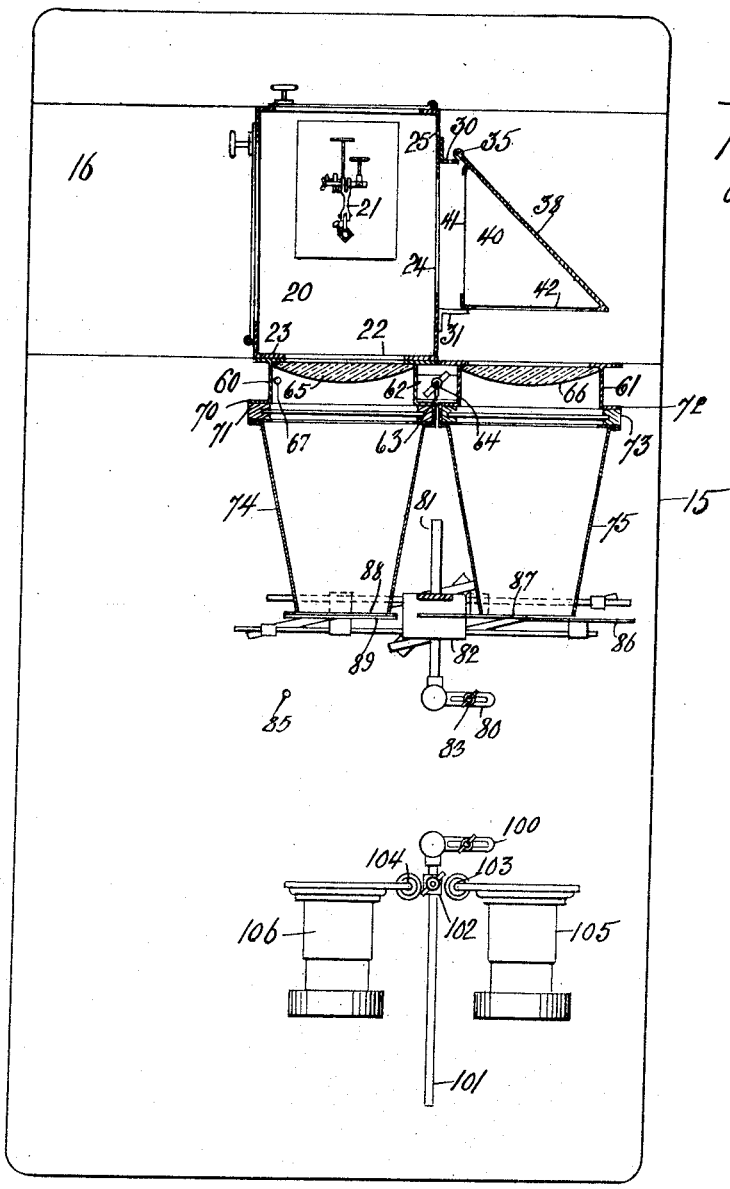

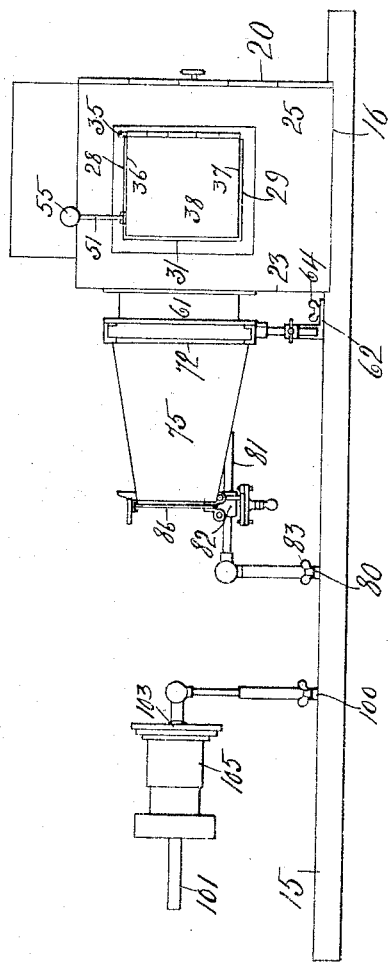

ns in Dissolving-View Apparatus, of
UNITED STATES PATENT OFFICE.

EBERHARD SCHNEIDER, OF NEW YORK, N. Y.

DISSOLVING-VIEW APPARATUS.

1,280,869.     Specification of Letters Patent.     Patented Oct. 8, 1918.

Application filed January 20, 1912. Serial No. 672,300.

*To all whom it may concern:*

Be it known that I, EBERHARD SCHNEIDER, a citizen of the United States, and a resident of the borough of Manhattan, in the county of New York and State of New York, have invented certain new and useful Improvements in Dissolving-View Apparatus, of which the following is a specification.

This invention relates to dissolving view apparatus which is adapted to be used with a picture machine.

It is characterized with a lamp house having a single source of light and that has attached to one side thereof an adjustable prism. By this disposition of parts the single source of light can reflect its rays directly to a condenser lens that has its axial center coincident with the longitudinal axis of the lamp house, and also to a second condenser lens parallel to the first. The lamp house is movable so that its longitudinal axis may be located in line with the longitudinal axis of a moving picture machine in which case either the latter may be used for projecting pictures on a screen, or the second condenser lens may be used with one of a pair of projecting lenses connected to the apparatus.

Referring to the drawings, Figure 1 represents a partial plan view and partial horizontal axial section of the invention, Fig. 1ᵃ shows a side elevation of the invention, Fig. 2 shows a top plan view of the invention and Fig. 3 represents a partial section of Fig. 2 on the line 3, 3.

A base board 15 with a depression 16 or tracks not shown, supports a lamp house or casing 20, containing the electric lamp 21. The lamp house or casing has the opening 22 in its front wall 23 and the opening 24 in its side wall 25. From the latter wall extends the projecting casing with the top wall 28, bottom wall 29, rear wall 30 and front curved wall 31. To the rear wall 30 is hinged by means of the hinge pin 35, a prism shaped housing or casing with the top wall 36, bottom wall 37 and vertical wall 38. A triangular prism 40 is carried in the prism shaped casing, which in its normal position has one of its surfaces 41 parallel to the longitudinal axis of the lamp house and its other surface 42 at right angles to said axis.

The lamp house or casing 20 can be moved to different positions in the depression 16.

Upon the top wall 28 of the projecting casing is supported a hollow stanchion 45 in which is rotatably supported the spindle 46. A collar 47 on the top end of the spindle supports a threaded sleeve 50. Upon the top wall 36 of the prism shaped casing is supported the stanchion 51, similar to 45 and that has a spindle similar to 46 for supporting the sleeve 52 that supports the adjusting rod 53. Upon the latter are fastened a pair of collars 54, the hand wheel 55 and the threaded end 56, which latter engages the threaded sleeve 50. By turning the hand wheel 55 the prism 40 can be located in different angular operative positions.

In front of the lamp house are located a pair of casings 60, 61 by means of a foot 62 having an elongated opening 63 and the clamping screw 64, that can register with either the opening 67 or 68 in the baseboard 15. The casing 60 carries the condenser lens 65 and the casing 61 carries the condenser lens 66. The casing 60 has formed therewith a slide carrier support 70, for the slide carrier 71 and the casing 61 has formed therewith the slide carrier support 72 for the slide carrier 73. A hood 74 extends from the support 70, and a hood 75 extends from the support 72.

In front of said hoods is adjustably fastened the foot 80 by means of the screw 83 engaging either the opening 84 or 85 in the base board 15. The horizontal rod 81, that carries the supporting frame 82 of two pairs of dissolving shutters 86, 87 and 88, 89 is supported by means of the foot 80. In front of the hood 74 is diagrammatically represented a moving picture machine 95 with its lens casing 96 of the usual construction, and which may be movably connected to the base board 15.

A foot 100 adjustably supports the horizontal rod 101, which latter carries a sleeve 102 with the ball and socket joints 103, 104. A projecting lens casing 105 with its usual lenses is supported by the joint 103, and a projecting lens casing 106 with its usual lenses is supported by the joint 104. To use the invention without the picture machine the relative positions of the lamp house and projecting lens casings 105, 106 are normally located as shown in Fig. 1, the screw 64 engaging the opening 66 and the screw 83 engaging the opening 84. Should it be desired to vary the location of the picture on the screen projected by the lenses in the casing 105, the prism 40 may be located in an angular position by means of the hand wheel 55 so that its surface 41 makes an angle with the longitudinal axis of the lamp house and the condenser lens 66 and the lenses in the casing may be adjusted in proper position therefor.

In case the picture machine 95 and the dissolving view apparatus are to be alternately used the elements are located as shown in Fig. 2, the screw 64 engaging the opening 67 and the screw 83 engaging the opening 85, wherein by a proper manipulation of the shutters the light rays from the lamp house may either be directed through the picture machine 95 or by way of the prism 40 through the condenser lens 66 and the lenses in the casing 106. It will be noted that the light rays that reflect to the surface 42 of the prism are deflected as they pass through said prism and leave it in lines perpendicular to the surface 42.

The invention may be modified by laterally moving the picture machine 95 and the lens casings 105, 106 instead of the lamp housing 20.

Having described my invention what I desire to secure by Letters Patent and claim is:

1. In a dissolving view apparatus the combination of a base board, a lamp house mounted to slide transversely of said base board, and having a prism housing at one side thereof, a prism in said housing, a single source of light in the lamp house, a pair of condensers having their axes parallel one to the other, means to locate said condensers so that one coacts directly with said source of light, the other coacting indirectly with said source of light through said prism, with different positions of the lamp house.

2. In a dissolving view apparatus the combination of a base board, a lamp house mounted to slide transversely of said base board and having a prism housing at one side thereof, a prism in said housing and mounted to turn, manually controlled means for turning said prism, a single source of light in said lamp house, a pair of condenser lenses having having their axes parallel one to the other in said apparatus, one of said condensers coacting directly with the source of light and the other condenser indirectly coacting with the source of light through the intervention of said prism and means to change the position of the condensers.

3. In combination with a moving picture machine, a base board, a lamp house mounted to slide transversely of said base board, two condensers coacting with the lamp house having their axes parallel one to the other, a single source of light in said lamp house coacting directly with one of said condensers and a prism interposed between the source of light and the other condenser, and a pair of parallel projecting lenses to one side of the moving picture machine, the said condensers in one position of the lamp house being in register with both projecting lenses, and in another position of said house one of the condensers being in register with the moving picture machine and the other condenser being in register with one of the said projecting lenses.

4. In combination, with a moving picture machine, a guide way transverse to the said moving picture machine and in the rear thereof, a lamp house mounted to slide on the said guideway, two condensers having their axes parallel one to the other coacting with the lamp house, a single source of light in said house opposite one of the said condensers, a prism interposed between the said source of light and the other condenser, and a pair of parallel projecting lenses to one side of the moving picture machine, the said condensers in one position of the casing being in register with both projecting lenses, and in another position of the casing one of the condensers being in register with the moving picture machine and the other condenser being in register with one of the said projecting lenses.

5. In an apparatus of the character described the combination of a movable lamp house, a single source of light in the lamp house, a prism adjustably connected to said lamp house, a condenser for the lamp house, a condenser for said prism, a picture machine opposite the lamp house in one position thereof, a pair of projecting lenses for the apparatus located so that in one position of the lamp house, the lamp house will be in line with one of them and the prism will be in line with the other, while in another position of the lamp house only the prism will be in line with one of the projecting lenses.

Signed at the borough of Manhattan in the county of New York and State of New York this 9th day of January A. D. 1912.

EBERHARD SCHNEIDER.

Witnesses:
A. A. DE BONNEVILLE,
MARGARETHE SCHNEIDER.

Copies of this patent may be obtained for five cents each, by addressing the "Commissioner of Patents, Washington, D. C."